(12) United States Patent
Hoffmann et al.

(10) Patent No.: US 7,377,271 B2
(45) Date of Patent: May 27, 2008

(54) CENTRIFUGAL OIL SEPARATOR FOR BLOW-BY GASES OF AN INTERNAL COMBUSTION ENGINE

(75) Inventors: Michael Hoffmann, Weinstadt (DE); Andreas Ruess, Stuttgart (DE)

(73) Assignee: Daimler AG, Stuttgart (DE)

( * ) Notice: Subject to any disclaimer, the term of this patent is extended or adjusted under 35 U.S.C. 154(b) by 131 days.

(21) Appl. No.: 11/284,442

(22) Filed: Nov. 21, 2005

(65) Prior Publication Data

US 2006/0090738 A1 May 4, 2006

Related U.S. Application Data

(63) Continuation-in-part of application No. PCT/EP2004/004614, filed on Apr. 30, 2004.

(51) Int. Cl.
*F02M 25/06* (2006.01)
(52) U.S. Cl. ...................................... 123/572
(58) Field of Classification Search ........ 123/572–574, 123/41.86
See application file for complete search history.

(56) References Cited

U.S. PATENT DOCUMENTS

| | | | |
|---|---|---|---|
| 1,051,017 A | 1/1913 | Schmidt | |
| 2,610,788 A | 9/1952 | Edwards | |
| 2,738,779 A | 3/1956 | Christianson et al. | |
| 4,329,968 A * | 5/1982 | Ishikawa et al. | 123/573 |
| 4,734,030 A | 3/1988 | Fenaux | |
| 5,542,402 A * | 8/1996 | Lee et al. | 123/573 |
| 5,850,764 A | 12/1998 | Bostelmann et al. | |
| 6,109,251 A * | 8/2000 | Haberlein et al. | 123/572 |
| 6,213,107 B1 * | 4/2001 | Gyllenstedt | 123/572 |
| 6,584,964 B1 * | 7/2003 | Seilenbinder et al. | 123/572 |
| 2002/0023631 A1 * | 2/2002 | Ito et al. | 123/572 |
| 2002/0026928 A1 * | 3/2002 | Korenjak et al. | 123/572 |
| 2002/0083933 A1 * | 7/2002 | Schmid et al. | 123/572 |
| 2003/0178014 A1 * | 9/2003 | Sauter et al. | 123/572 |

FOREIGN PATENT DOCUMENTS

| | | |
|---|---|---|
| DE | 640 225 | 12/1936 |
| DE | 196 07 919 | 9/1997 |
| DE | 199 47 143 | 4/2001 |

* cited by examiner

*Primary Examiner*—M. McMahon
(74) *Attorney, Agent, or Firm*—Klaus J. Bach

(57) ABSTRACT

In a centrifugal oil separator for blow-by gases of an internal combustion engine comprising a rotating component which has at least one inflow port for the introduction of blow-by gases from the crankcase of the internal combustion engine, at least a first outflow port for the discharge of air and at least a second outflow port for the discharge of oil, and also a driveshaft (12) driving the rotating component for driving the rotating component, the driveshaft of the rotating component is connected via a mechanical coupling to a transmission driven by a crankshaft of the internal combustion engine.

3 Claims, 2 Drawing Sheets

CENTRIFUGAL OIL SEPARATOR FOR BLOW-BY GASES OF AN INTERNAL COMBUSTION ENGINE

This is a Continuation-In-Part Application of International application PCT/EP2004/004614 filed Apr. 30, 2004 and claiming the priority of German application 103 23 261.3 filed May 23, 2003.

BACKGROUND OF THE INVENTION

The invention relates to a centrifugal oil separator for blow-by gases of an internal combustion engine with a rotating component which has an inlet port for the introduction of blow-by gases from a crankcase of the internal combustion engine and first and second outlets ports for the discharge of air and oil, respectively.

Centrifugal oil separators of this kind are used in venting devices for the crankcase of an internal combustion engine for the separation of oil from an oil/air mixture which is discharged from the cylinder head of the internal combustion engine. The venting line for the air purified of the oil extends to the air intake line of the internal combustion engine. The blow-by gases are thus sucked out of the crank case of the internal combustion engine constantly, that is in all engine operating states, and are conveyed back into the intake line, with the result that they are returned for renewed combustion in the cylinders. As a result of such a venting of the blow-by gases, the oil contamination is reduced considerably, and as the oil is returned to the crankcase this may result in much longer oil change intervals.

A centrifugal oil separator of this kind for blow-by gases of an internal combustion engine is known, for example, from DE 196 07 919 A1 or DE 199 47 143 C1. The centrifugal oil separator described in DE 196 07 919 A1 is distinguished by an especially effective separation of oil from the blow-by gases, while the centrifugal oil separator disclosed in DE 199 47 143 C1 is designed so as to be especially compact.

It is, the object of the present invention to provide a centrifugal oil separator with a simple and cost-effective rotary drive of its rotating component.

SUMMARY OF THE INVENTION

In a centrifugal oil separator for blow-by gases of an internal combustion engine comprising a rotating component which has at least one inflow port for the introduction of blow-by gases from the crankcase of the internal combustion engine, at least a first outflow port for the discharge of air and at least a second outflow port for the discharge of oil, and also a driveshaft for driving the rotating component, the driveshaft of the rotating component is connected via a mechanical coupling to a transmission driven by a crankshaft of the internal combustion engine.

In a particular embodiment of the invention, the transmission to which the driveshaft of the rotating component of the centrifugal oil separator is coupled is a gearwheel-type change transmission. With a suitably selected step-up of the mechanical coupling between the drive shaft of the rotating component and the gearwheel-type change transmission, only one mechanical connection to the gearwheel-type change transmission has to be made in order to achieve the required rotational speeds of the driveshaft of the rotating component.

In an alternative embodiment of the invention, the transmission is a turbo compound transmission. The particular advantage of the mechanical coupling of the driveshaft of the rotating component of the centrifugal oil separator to a turbo compound transmission is the high rotational speed level of the turbo compound transmission, which is why there is generally no need for any further step-up transmission in order to achieve the high rotational speeds necessary for the centrifugal oil separator.

In a further embodiment of the invention, a controllable coupling may be provided between the driveshaft of the centrifugal oil separator and the transmission, so that the rotational speed of the rotating component of the centrifugal oil separator can be controlled.

According to a second aspect of the invention, the abovementioned object is achieved by means of a centrifugal oil separator with a hydraulic drive integrated into a fluid line of the internal combustion engine.

The centrifugal oil separator according to the invention for blow-by gases of an internal combustion engine may furthermore be distinguished in that the driveshaft of the rotating component is connected to a hydraulic drive which is integrated into a fluid line of the internal combustion engine. In this case, too, already existing components of an internal combustion engine are used for the rotary drive of the driveshaft of the centrifugal oil separator, and therefore the centrifugal oil separator of the invention can be implemented in a technically simple and cost-effective way.

In a particular embodiment of the invention, the hydraulic drive is integrated into a fuel line leading to the internal combustion engine. Alternatively, the hydraulic drive may be integrated into a low-pressure fuel circuit between a fuel feed pump and a high-pressure fuel pump. It may be assumed that, in some operating states of the internal combustion engine, the fuel pump feeds an excess fuel quantity, the excess energy of which can thus be used for driving the centrifugal oil separator, without consumption of additional energy.

In a further embodiment of the invention, in the centrifugal oil separator according to the second aspect of the invention, too, a controllable coupling may be provided between the driveshaft and the hydraulic drive in order to control the rotational speed of the rotating component of the centrifugal oil separator.

Exemplary embodiments of the invention are illustrated in simplified form in the drawings and are explained below in more detail with reference to the accompanying drawings:

DESCRIPTION OF THE PREFERRED EMBODIMENT OF THE INVENTION

Figure 1:
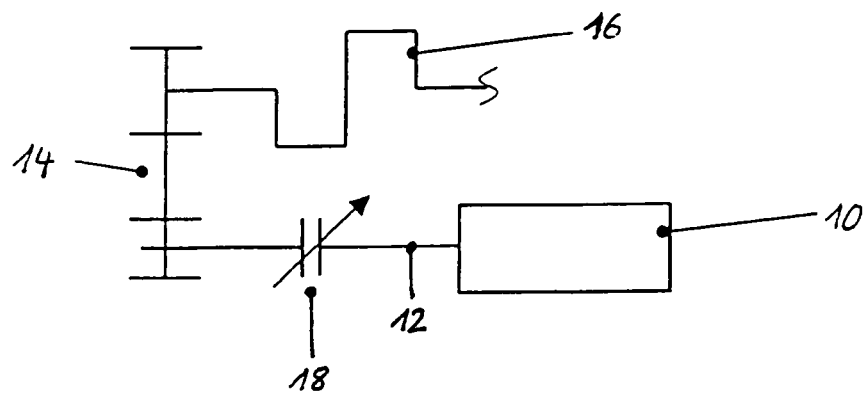
FIG. 1 shows a greatly simplified block diagram of rotary drive arrangement for a centrifugal oil separator according to the present invention.

The centrifugal oil separator, identified in FIG. 1 by the reference numeral 10, for blow-by gases which are discharged from the crankcase of an internal combustion engine has a rotating component which is provided with a driveshaft 12 for driving the rotating component. The rotating component conventionally has at least one inflow port for the introduction of blow-by gases from the crankcase of the internal combustion engine, at least one first outflow port for the discharge of air and at least one second outflow port for the discharge of oil. It may be expressly pointed out, at this juncture, that the present invention is not restricted to a special design of a centrifugal oil separator, but that any desired design of a centrifugal oil separator, the rotating component of which is coupled to a driveshaft, may be used.

In the exemplary embodiment of FIG. 1, the driveshaft 12 of the rotating component of the centrifugal oil separator 10 is connected to a gearwheel-type change transmission 14 by means of a mechanical coupling 18. The gearwheel-type change transmission 14 is conventionally driven by the crankshaft 16 of the internal combustion engine. In the centrifugal oil separator 10 according to the exemplary embodiment illustrated in FIG. 1, therefore, only one mechanical coupling to already existing components of the internal combustion engine, in this case to the gearwheel-type speed change transmission, is required. With a suitable step-up of the mechanical coupling between the driveshaft 12 and the gearwheel-type speed change transmission 14, the required rotational speeds of the centrifugal oil separator 10 can easily be achieved.

As illustrated in FIG. 1, a controllable coupling 18 may optionally be provided between the drive shaft 12 of the centrifugal oil separator 10 and the gearwheel-type speed change transmission 14, in order to control the rotational speed of the driveshaft 12 and consequently of the rotating component of the centrifugal oil separator 10.

Figure 2:
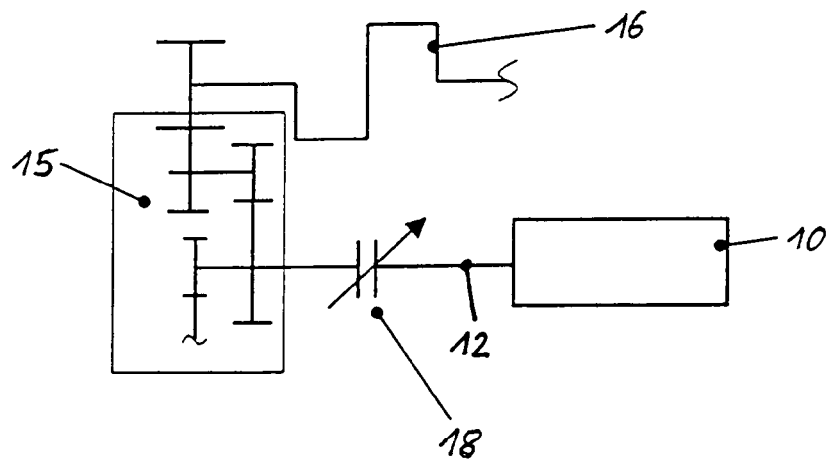
FIG. 2 shows a greatly simplified block diagram of an alternative drive arrangement for of a centrifugal oil separator according to the present invention.

FIG. 2 shows an alternative embodiment of FIG. 1 for the rotary drive of a centrifugal oil separator 10. Identical components or structural parts of this alternative embodiment are given the same reference numerals as in the exemplary embodiment of FIG. 1.

In the embodiment of FIG. 2, the driveshaft 12 of the rotating component of the centrifugal oil separator 10 is connected to a turbo compound transmission 15 via a suitable mechanical coupling. The turbo compound transmission is driven in a known way by the crankshaft 16 of the internal combustion engine. The coupling of the driveshaft 12 of the rotating component of the centrifugal oil separator 10 to a turbo compound transmission 15 has the advantage that, on account of the high rotational speed level of the turbo compound transmission 15, there is generally no need for any further step-up of the mechanical coupling between the driveshaft 12 and the transmission 15 in order to achieve the high rotational speeds of the centrifugal oil separator 10. In this embodiment, too, however, it is possible to provide between the driveshaft 12 of the centrifugal oil separator 10 and the turbo compound transmission 15 a controllable coupling 18 for controlling the rotational speed of the driveshaft 12 or of the rotating component of the centrifugal oil separator 10.

While, in the exemplary embodiments, illustrated in FIGS. 1 and 2, of the centrifugal oil separator, the driveshaft of the centrifugal oil separator is coupled to a gearwheel-type speed change transmission or to a turbo compound transmission, the present invention can basically also be applied to other types of transmission which are driven via the crankshaft of the internal combustion engine.

Figure 3:
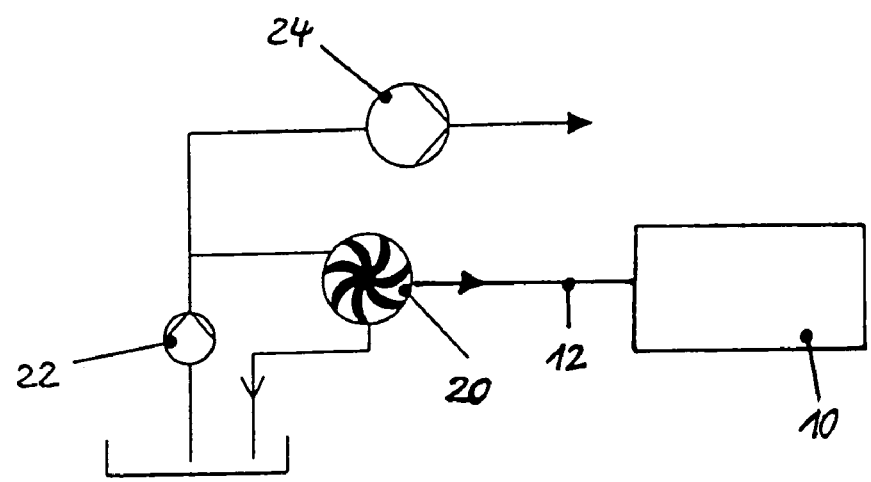
FIG. 3 shows a greatly simplified block diagram of another alternative rotary drive arrangement for a centrifugal oil separator according to the present invention.

With reference to FIG. 3, another embodiment of a rotary drive of a centrifugal oil separator is explained in more detail.

The centrifugal oil separator 10 of basically any design has a rotating component which is connected to a driveshaft 12. Furthermore, the rotating component of the centrifugal oil separator has at least one inflow port for the introduction of blow-by gases from the crankcase of the internal combustion engine, at least one first outflow port for the discharge of air and at least one second outflow port for the discharge of oil.

As illustrated in FIG. 3, the driveshaft 12 of the rotating component of the centrifugal oil separator is connected to a hydraulic or hydrodynamic drive 20. The hydraulic or hydrodynamic drive 20 is integrated into an existing fluid line of the internal combustion engine, so that, on account of the use of already existing components of the internal combustion engine, this rotary drive of the centrifugal oil separator can also be implemented in a technically simple and cost-effective way.

In the exemplary embodiment illustrated in FIG. 3, the hydraulic drive 20 of the driveshaft 12 of the centrifugal oil separator 10 is integrated into a low-pressure fuel circuit between a fuel feed pump 22 and a high-pressure fuel pump 24. In this case, part of the fuel volume flow fed by the fuel feed pump is converted into rotational energy in the hydraulic drive 20 and is transmitted to the driveshaft 12. What may be considered as a particular advantage of this embodiment of the rotary drive of the centrifugal oil separator 10 is that, by a suitable hydraulic drive 20 being mounted in the already existing fuel circuit, the required rotational movement of the driveshaft 12 and consequently of the rotating component of the centrifugal oil separator 10 can be achieved relatively simply. Moreover, it must be assumed that, in some operating states of the internal combustion engine, the fuel feed pump 22 provides an excess fuel quantity, the energy of which can thus be used for the rotary drive of the centrifugal oil separator 10 without consumption of additional energy.

In an alternative embodiment of the rotary drive illustrated in FIG. 3, the hydraulic drive 20 may also be integrated directly into a fuel line leading to the internal combustion engine. Furthermore, also in this centrifugal oil separator, it is possible to provide a controllable coupling (not illustrated) between the driveshaft 12 of the rotating component of the centrifugal oil separator 10 and the hydraulic drive 20, in order to control the rotational speed of the driveshaft 12 of the centrifugal oil separator.

What is claimed is:

1. A centrifugal oil separator (10) for blow-by gases of an internal combustion engine, comprising a rotating component which has at least one inlet port for the introduction of blow-by gases from the crankcase of the internal combustion engine, at least a first outlet port for the discharge of air and at least a second outlet port for the discharge of oil, and also a driveshaft (12) for driving the rotating component, the driveshaft (12) of the rotating component being connected via a mechanical coupling (18) to a transmission (14, 15) driven by a crankshaft (16) of the internal combustion engine, said mechanical coupling (18) being controllable for controlling the rotational speed of the rotating component of the centrifugal oil separator (10).

2. The centrifugal oil separator as claimed in claim 1, wherein the transmission (14) is a gearwheel-type speed change transmission.

3. The centrifugal oil separator as claimed in claim 1, wherein the transmission (15) is a turbo compound transmission.

* * * * *